(12) United States Patent
Duan

(10) Patent No.: US 9,718,102 B2
(45) Date of Patent: Aug. 1, 2017

(54) WORKPIECE CLEANING MECHANISM

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventor: Heng Duan, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 476 days.

(21) Appl. No.: 14/451,873

(22) Filed: Aug. 5, 2014

(65) Prior Publication Data

US 2015/0040339 A1 Feb. 12, 2015

(30) Foreign Application Priority Data

Aug. 6, 2013 (CN) .................... 2013 2 0474079 U

(51) Int. Cl.
*B08B 5/02* (2006.01)
*B65G 47/26* (2006.01)
*B65G 13/02* (2006.01)

(52) U.S. Cl.
CPC ............. *B08B 5/023* (2013.01); *B08B 5/02* (2013.01); *B65G 13/02* (2013.01); *B65G 47/26* (2013.01)

(58) Field of Classification Search
CPC .......... B08B 5/023; B08B 5/02; B65G 13/02; B65G 47/26
USPC ............................................. 198/457.02, 620
See application file for complete search history.

(56) References Cited

U.S. PATENT DOCUMENTS

| 2,736,417 | A | * | 2/1956 | Greer | ................... | A21B 3/07 |
| | | | | | | 156/566 |
| 8,794,423 | B2 | * | 8/2014 | Sasstamo | ................. | B07C 5/14 |
| | | | | | | 198/457.02 |
| 2001/0004042 | A1 | * | 6/2001 | Ikeda | ..................... | B65G 43/08 |
| | | | | | | 198/456 |
| 2012/0024669 | A1 | * | 2/2012 | Danelski | ................ | B65G 43/10 |
| | | | | | | 198/617 |
| 2014/0251759 | A1 | * | 9/2014 | Yin | ..................... | B65G 47/907 |
| | | | | | | 198/459.3 |

* cited by examiner

*Primary Examiner* — Michael Jennings
(74) *Attorney, Agent, or Firm* — Steven Reiss

(57) ABSTRACT

An air-sourced cleaning and deburring workpiece mechanism includes a fixed frame, a transfer assembly coupled to the fixed frame, and a cleaning assembly. The cleaning assembly includes a drive member, a slide member, and a first cleaning member. The drive member can drive the first cleaning member to move back and forth along a transfer direction of the transfer assembly, so that the first cleaning member can be applied to a workpiece.

12 Claims, 3 Drawing Sheets

WORKPIECE CLEANING MECHANISM

FIELD

The subject matter herein generally relates to manufacturing processes.

BACKGROUND

A mechanism is used to clean workpieces.

BRIEF DESCRIPTION OF THE DRAWINGS

Implementations of the present technology will now be described, by way of example only, with reference to the attached figures.

BRIEF SUMMARY OF THE INVENTION

Figure 1:
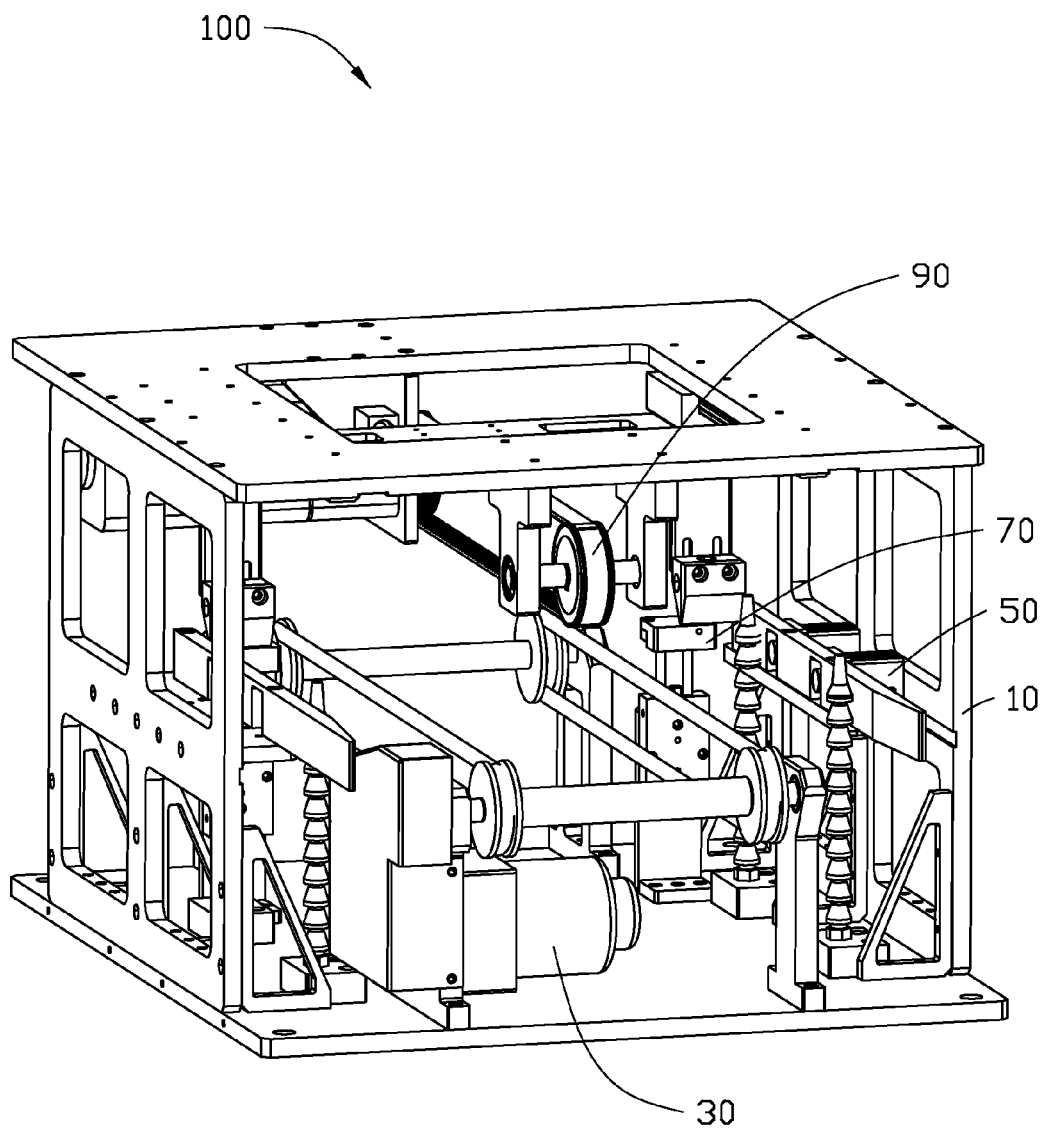
FIG. 1 is an isometric view of an embodiment of a cleaning mechanism.

A cleaning mechanism can include a fixed frame, a transfer assembly, and a cleaning assembly. The transfer assembly can be installed in the fixed frame and configured to transport a workpiece. The cleaning assembly can include a cleaning drive member coupled to the fixed frame, a fixing bracket coupled to the fixed frame and spaced from the cleaning drive member, and a second belt sleeved on the cleaning drive member and the fixing bracket. The cleaning assembly can also include a slide member coupled to the second belt and movably installed on the fixed frame, and a first cleaning member coupled to the slide member and located between the slide member and the transfer assembly. A moving direction of the second belt can be parallel to a transfer direction of the transfer assembly. The cleaning drive member can be configured to move the second belt back and forth along the transfer direction, and thereby driving the first cleaning member to move back and forth along the transfer direction.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates an embodiment of a workpiece cleaning mechanism 100. The cleaning assembly can be configured to remove pollutants, such as dust, dirt, or burrs on surfaces of a workpiece 300 (see FIG. 3). The workpiece cleaning mechanism 100 can include a fixed frame 10, a transfer assembly 30, two positioning members 50, two stopper assemblies 70, and a cleaning assembly 90. The transfer assembly 30, the two positioning members 50, and the two stopper assemblies 70 can be installed on the fixed frame 10 and located inside the fixed frame 10. The two positioning members 50 can be installed at opposite sides of the transfer assembly 30. The two stopper assemblies 70 can be installed at an end of the transfer assembly 30 away from the two positioning members 50. The cleaning assembly 90 can be above the fixed frame 10 and coupled to it.

Figure 2:
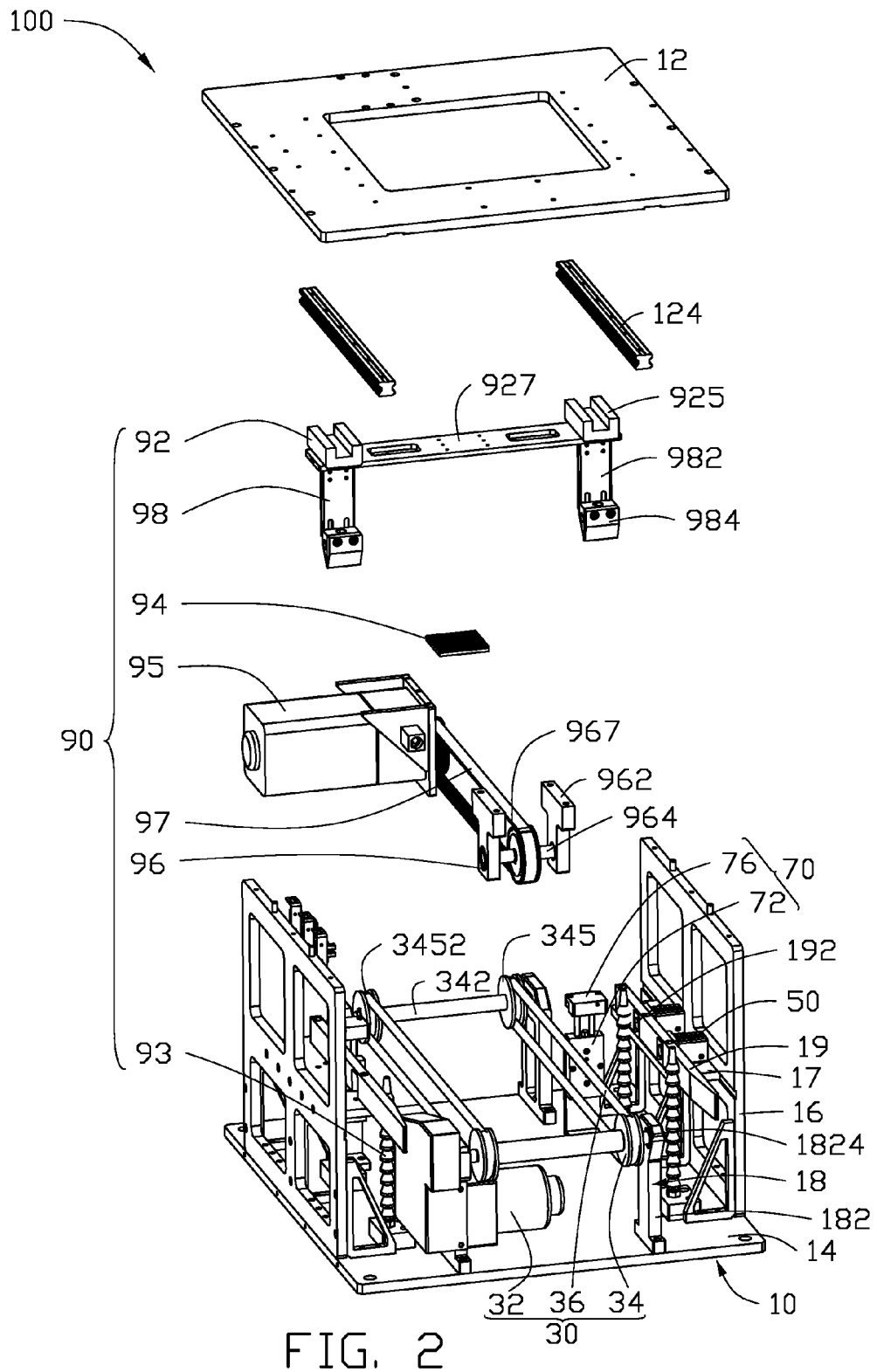
FIG. 2 is an exploded, isometric view of the cleaning mechanism of FIG. 1.

FIG. 2 illustrates that the fixed frame 10 can include a top plate 12, a bottom plate 14 opposite to the top plate 12, two side plates 16 parallel to each other, two connecting members 17 parallel to each other, two support members 18, and two guide members 19. Two tracks 124 can be installed on the top plate 12, and each track 124 can be substantially strip-shaped. Each side plate 16 can be coupled to the top plate 12 and the bottom plate 14. Each connecting member 17 can be installed on an inside wall of a side plate 16. Each connecting member 17 can be substantially plate-shaped and parallel to the bottom plate 14.

The two support members 18 can be coupled to opposite ends of the bottom plate 14 and located between the two connecting members 17. Each support member 18 can include two parallel support brackets 182. Each support bracket 182 can be substantially plate-shaped and define a through hole 1824 at an end away from the bottom plate 14. The two guide members 19 can be respectively coupled to the two connecting members 17, and each guide member 19 can be located between a support member 18 and a connecting member 17. Each guide member 19 can be substantially strip-shaped and define two spaced inserting holes 192. In at least one embodiment, a number of the support members 18 can be three, four, five, or more.

The transfer assembly 30 can include a first drive member 32, two rotator members 34, and two second belts 36. The first drive member 32 can be coupled to a support member 18 and a controller (not shown). The controller can control the first drive member 32 to rotate. The two rotator members 34 can be respectively installed on the two support members 18. Each rotator member 34 can include a shaft 342 and two spaced wheels 345 firmly sleeved on the shaft 342. Each shaft 342 can be movably received in the through holes 1824 of the two support members 182. One of the shafts 342 can be coupled to the first drive member 32, so that the first drive member 32 can rotate the shaft 342. Each wheel 345 can define a receiving groove 3452. Each second belt 36 can be substantially in a shape of a loop and sleeved on two wheels 345. The second belts 36 can be received in the receiving grooves 3452 of the two wheels 345. In at least one embodiment, a number of the rotator members 34 can be three, four, five, or more. In at least one embodiment, the first drive member 32 can be a motor.

Each of the two positioning members 50 can be coupled to a connecting member 17 and spaced from each other. An end portion of each positioning member 50 can be movably received in an inserting hole 192. In at least one embodiment, the positioning members 50 can be cylinders. In other embodiments, the two positioning members 50 can each be installed on one of the connecting members 17. In at least one embodiment, a number of the positioning members 50 can be one or more than two.

Each stopper assembly 70 can include a second drive member 72 and a sensor 76. Two second drive members 72 of the two stopper assemblies 70 can be coupled to the bottom plate 14 and adjacent to an end of the second belt 36. The sensor 76 can be coupled to the second drive member 72 and the controller. The sensor 76 can be substantially block-shaped and configured to detect when the workpiece 300 touches the sensor 76. In at least one embodiment, the second drive member 72 can be a cylinder. A number of the stopper assemblies 70 can be one or more than two.

The cleaning assembly 90 can include a slide member 92, a fixing member 94, a cleaning drive member 95, a fixing bracket 96, a first belt 97, two first cleaning members 98, and a plurality of second cleaning members 93.

The slide member 92 can be movably installed on two tracks 124. The slide member 92 can include two slide blocks 925 and a connecting plate 927 coupled to the two slide blocks 925. The slide blocks 925 can be movably installed on the tracks 124 and configured to move along the tracks 124. A moving direction of the slide block 925 can be parallel to a transfer direction of the second belt 36.

The cleaning drive member 95 can be coupled to the top plate 12 and positioned adjacent to the sensor 76. In at least one embodiment, the cleaning drive member 95 can be a motor. The fixing bracket 96 can be coupled to the top plate 12. The fixing bracket 96 can include two spaced fixing plates 962 coupled to the top plate 12, a rod 964 coupled to the two fixing plates 962, and a pulley 967 movably sleeved on the rod 964. The first belt 97 can be substantially a loop. A first end portion of the first belt 97 can be sleeved on the cleaning drive member 95, and a second end portion of the first belt 97 can be sleeved on the pulley 967. A moving direction of the first belt 97 can be parallel to the transfer direction of the second belt 36.

The fixing member 94 can be coupled to the connecting plate 927 and the first belt 97, so that the first belt 97 can move the connecting plate 927. Each first cleaning member 98 can include a holding plate 982 coupled to an end portion of the connecting plate 927 and an air knife 984 coupled to an end portion of the holding plate 982. The holding plate 982 can be located at a side of the connecting plate 927 away from the slide block 925 and positioned adjacent to the second belt 36. The air knife 984 can be coupled to an air source (not shown) and include an opening (not shown) toward the second belt 36. The second cleaning members 93 can be installed at two sides of the bottom plate 14 and positioned adjacent to the second belt 36. The second cleaning members 93 can be coupled to the air source and include an opening (not shown) toward the second belt 36. In at least one embodiment, the second cleaning members 93 can be blowpipes and made from flexible materials, so that the second cleaning members 93 can be deformed in shape. A number of the second cleaning members 93 can be four. In at least one embodiment, a number of the second cleaning members 93 can be one, two, three, or more than four. The second cleaning members 93 can be installed on the side plates 16 of the fixed frame 10 so long as the openings of the cleaning members 93 extend toward the second belt 36.

Figure 3:
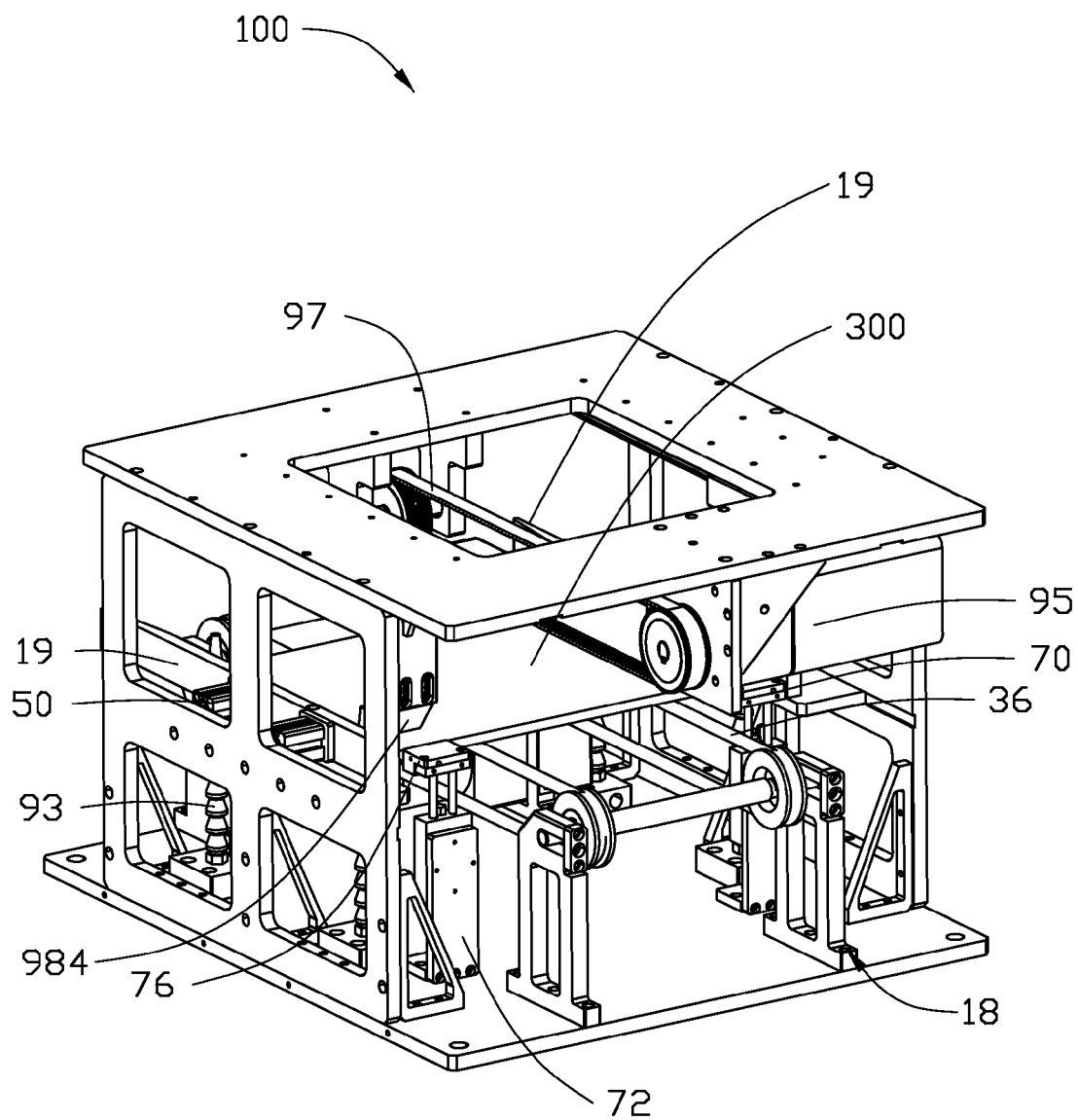
FIG. 3 is an isometric view of the cleaning mechanism of FIG. 1 in a state of use.

FIG. 3 illustrates the positioning of the workpiece 300. The workpiece 300 can be transported from a production line (not shown) to the second belt 36 via the guide members 19. When the workpiece 300 touches the sensor 76, the controller can stop a rotation of the first drive member 32, so that the workpiece 300 is not moving. The two positioning members 50 can push the workpiece 300 to move toward a guide member 19, the workpiece 300 can thereby be clamped between the positioning members 50 and the guide member 19.

For cleaning the workpiece 300, the air knives 984, coupled to the air source, can be employed. The cleaning drive member 95 can drive the first belt 97 to move back and forth along the second belt 36, the air knives 984 can thus move back and forth along the second belt 36 above the workpiece 300, so that surface pollutants of the workpiece 300 can be removed. The second cleaning members 93 can direct air toward a bottom surface of the workpiece 300, to remove other surface pollutants. In this way, the first cleaning members 98 and the second cleaning members 93 can clean the workpiece 300 from different angles. The positioning members 50 can move away from the workpiece 300 after the workpiece 300 is cleaned, and the second drive member 72 can drive the sensor 76 to move away from the workpiece 300. The first drive member 32 can drive the second belt 36 to transport the workpiece 300 to a next process.

In at least one embodiment, the tracks 124 and the slide blocks 925 can be omitted so long as the first belt 97 drives the first cleaning member 98 to move back and forth along the second belt 36. The connecting members 17, the support members 18, and the guide members 19 can be omitted, and the positioning members 50, the first drive member 32 and the rotator member 34 can be installed on the side plates 16. The fixing member 94 and the connecting plate 927 can be omitted, and the first cleaning members 98 can be connected directly to the first belt 97. All of the positioning members 50, the stopper assemblies 70, and the second cleaning members 93 can be omitted so long as access to all pollutants on the workpiece 300 can be achieved.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:
1. A workpiece cleaning mechanism comprising:
  a fixed frame;
  a transfer assembly installed in the fixed frame and configured to transport a workpiece; and
  a cleaning assembly comprising:
    a cleaning drive member coupled to the fixed frame,
    a fixing bracket coupled to the fixed frame and spaced from the cleaning drive member,
    a first belt sleeved on the cleaning drive member and the fixing bracket, wherein a moving direction of the first belt is parallel to a transfer direction of the transfer assembly,
    a slide member coupled to the first belt and movably installed on the fixed frame, and a first cleaning member coupled to the slide member and located between the slide member and the transfer assembly, wherein the cleaning drive member is configured to drive the first belt to translate in a direction parallel to the transfer direction, and thereby driving the first cleaning member to correspondingly translate in the direction parallel to the transfer direction.

2. The workpiece cleaning mechanism of claim 1, wherein the cleaning assembly further comprises a second cleaning member coupled to the fixed frame and positioned adjacent to the transfer assembly, wherein the second cleaning member is configured to clean the workpiece from an angle different from a cleaning angle of the first cleaning member.

3. The workpiece cleaning mechanism of claim 2, wherein the second cleaning member is a blowpipe and made from flexible materials.

4. The workpiece cleaning mechanism of claim 1, wherein the transfer assembly comprises:
   a first drive member coupled to the fixed frame,
   at least two rotator members movably installed in the fixed frame, one of the at least two rotator member is coupled to the first drive member, and
   at least two second belts, each of the at least two second belts is sleeved on the at least two rotator members.

5. The workpiece cleaning mechanism of claim 4, wherein the workpiece cleaning mechanism further comprises:
   a stopper assembly, the stopper assembly comprises:
      a second drive member coupled to the fixed frame and adjacent to the second belts, and
      a sensor coupled to an end portion of the second drive member, wherein the sensor is configured to detect when the workpiece touches the sensor.

6. The workpiece cleaning mechanism of claim 1, wherein at least two tracks protrude from a side of the fixed frame adjacent to the transfer assembly, and the slide member is movably installed on the at least two tracks.

7. The workpiece cleaning mechanism of claim 6, wherein the slide member comprises:
   at least two slide blocks installed on the at least two tracks, a moving direction of the at least two slide blocks is parallel to the transfer direction of the transfer assembly, and
   a connecting plate coupled to the at least two slide blocks.

8. The workpiece cleaning mechanism of claim 1, wherein the fixed frame comprises:
   a top plate, the slide member is movably installed on the top bottom,
   a bottom plate opposite to the top plate, the transfer assembly is coupled to the bottom plate,
   two side plates parallel to each other, and
   two guide members installed on the two side plates and located between the two side plates.

9. The workpiece cleaning mechanism of claim 8, wherein each guide member defines an inserting hole, the workpiece cleaning mechanism further comprises a positioning member coupled to a side plate, an end portion of the positioning member away from the side plate is movably received in the through hole.

10. The workpiece cleaning mechanism of claim 8, wherein the fixed frame further comprises a support member installed on the bottom plate, the transfer assembly is coupled to the support member.

11. The workpiece cleaning mechanism of claim 1, wherein the first cleaning member comprises a holding plate coupled to the slide member and an air knife coupled to a terminal of the holding plate, the air knife is configured to clean the workpiece.

12. The workpiece cleaning mechanism of claim 1, wherein the workpiece cleaning mechanism further comprises a fixing member coupled to the slide member and the first belt.

* * * * *